CONDITIONS FOR THE PRECIPITATION OF Mn FERRITE
(THE RATIO $Mn^{+2}/Fe^{+2}$ IN STARTING SOLUTION IS 1/2)

CONDITIONS FOR THE PRECIPITATION OF Co FERRITE
(THE RATIO $Co^{+2}/Fe^{+2}$ IN STARTING SOLUTION IS 1/2)

CONDITIONS FOR THE PRECIPITATION OF Zn FERRITE
(THE RATIO $Zn^{+2}/Fe^{+2}$ IN STARTING SOLUTION IS 1/2)

- REACTION AT 30°C
- × REACTION AT 50°C
- ○ REACTION AT 70°C

INVENTORS
KEIZO IWASE
TOSHIO TAKADA
MASAO KIYAMA

ATTORNEYS.

CONDITIONS FOR THE PRECIPITATION OF $Fe_3O_4$

United States Patent Office 3,822,210
Patented July 2, 1974

3,822,210
FINE SPINEL-TYPE FERRITE PARTICLES FEATURING HIGH DISPERSIBILITY AND THE PROCESS OF MANUFACTURE OF SAME
Keizo Iwase, 52 Tadekura-cho, Shimogamo; Toshio Takada, 1 Nishisenouchi-cho, Kitashirakawa; and Masao Kiyama, 12–67 Shobuen-cho, Kamikamo, Kita-ku, all of Kyoto, Japan
Continuation of application Ser. No. 871,542, Nov. 9, 1969, which is a continuation of application Ser. No. 528,747, Feb. 21, 1966, both now abandoned. This application Aug. 10, 1972, Ser. No. 279,317
Int. Cl. C04b 35/32, 35/38
U.S. Cl. 252—62.64
18 Claims

ABSTRACT OF THE DISCLOSURE

Spinel-type single-crystal ferrite particles are provided of substantially isotropic shape containing iron and at least one kind of divalent metal other than iron, the ratio of the total number of iron atoms to the divalent metal atoms being at least 2 to 1, the average particle size ranging from about 0.05 to 1.0 micron. The ferrite crystals are made by admixing an aqueous solution containing ferrous ions and the divalent metal ions with 0.55 to 3 mol equivalents, relative to acid in the solution, of an alkali to obtain a suspension of the hydroxides at a pH of more than 6.5 and thereafter bubbling an oxidizing gas into the suspension maintained at 60° C. to 90° C. until the hydroxides disappear and ferrite particles are formed.

---

This is a continuation of application Ser. No. 871,542 filed Nov. 9, 1969, which is a continuation of application Ser. No. 528,747, filed Feb. 21, 1966, both now abandoned.

The present invention relates to ferrite particles of the spinel type crystal structure and more particularly, to ferrite particles of the kind suitable as a raw material for sintered ferrites, ferromagnetic recording materials, or pigments.

On account of the needle-like shape of $\gamma\text{-}Fe_2O_3$ particles that have been used as memories of magnetic tape, dense dispersion of particles in a dispersing medium to be applied on the tape base present various technical difficulties. It was anticipated that this defect could be relieved, to a certain extent, by adopting ferromagnetic particles of the isotropic crystal shape. Although ferrite particles of the spinel type have found application as a raw material for sintered ferrites, ferromagnetic recording materials, or pigments, ferrites in particle form most suitable for such applications in respects of shape, size, and dispersibility in various dispersing media have not as yet been developed. Thus, as a matter of fact, known spinel type ferrite particles have been restricted to ones manufactured by what are commonly called the dry or wet method.

The dry method has been more widely used in the manufacture of ferrite powders, consisting in mixing ferric oxide $Fe_2O_3$ and one or more divalent metal oxides both in powder form, subjecting the mixture to a heating process at 1000° C. or more, and producing a ferrite through what has been called the solid state reaction. Ferrite obtained by this method is normally in the form of aggregate particles, several microns or more in diameter, each consisting of a number of unit particles sintered together. The diameters of unit particles are of the order of 0.2 micron at a minimum. At times, these aggregate particles undergo further sintering action to become masses of sponge cake form. Therefore aggregate particles of ferrite prepared by the dry method can not be used, as they are, on account of poor dispersibility of ferrite particles in dispersing media in manufacturing pigments or magnetic recording materials. Further, in making ferrite magnets or ferrite cores, the presence of such large aggregate particles results in low apparent density of a subsequently formed green compact, has poor compactibility and inhibits the lowering of the sintering temperature of the green compact. Therefore aggregate particles of ferrite obtained by the dry method must be subjected to a pulverizing process by all means. According to the pulverizing techniques that have been developed heretofore, however, it is difficult to convert all aggregate particles into unit particles, less than 1 micron in diameter, for instance. Therefore there would be a much less possibility for industrial pulverization of unit particles into finer particles. Since the production of tiny fragments, say less than 0.01 micron in diameter, is inevitable in pulverizing such aggregate particles by any known technique, the particle size distribution curve taken for the pulverized particles will encompass a wide range. This tendency will cause, for example, color tone of a pigment to be deviated considerably from what was initially contemplated or the magnetic recording characteristics to be degraded from the anticipated. To conclude, ferrite particles prepared by the dry method can scarcely be said to be suitable for pigments or ferromagnetic recording materials. Thus the advent of ferrite powders consisting of well dispersed unit particles, 0.05 micron or more in diameter, has been keenly demanded by those skilled in this technical field.

Now the conventional wet method employs a process of neutralizing an aqueous solution containing ferric ions $Fe^{+3}$ and one or more kinds of divalent metal ions $M^{+2}$. For instance, an alkali is added to an aqueous solution containing a mixture of a ferric salt such as ferric sulphate and a divalent metallic salt in the atom ratio of 2 to 1 and, on heating the solution thus prepared, a precipitate of ferrite particles is obtained. (Reference: W. J. Schuele and V. D. Deetscreek "Journal of Applied Physics" 23 (1961), pp. 235–336.) This method has been adapted on a laboratory scale, but not industrially. The reason is probably twofold. First, the precipitate of ferrite particles thus prepared is extremely fine, being in colloidal form and less than 0.05 micron in diameter. This renders reduction of the experiment to industrial application extremely difficult, because processes such as sedimentation, filtration, and washing with water are not only difficult, but also economically impracticable. Granted that these problems have been solved, there are still other industrial difficulties which remain unsolved. On drying the precipitate tends to form extremely hard masses in much the same way as in case of the so-called ultrafine particles and however pulverized, it is next to impossible to convert such masses into ferrite powder having favorable dispersibility. Second, in order that this method may be industrially feasible, the ferric salt or its aqueous solution as starting material must be procured inexpensively and in large quantities. Our experience teaches the reverse. It is true that a ferrous salt may be procured easily and inexpensively from pickling solutions of iron plates in the form of $FeSO_4.7H_2O$, for instance, or as a by-product in the manufacture of titanium dioxide and which may be oxidized to obtain an aqueous solution of the ferric salt, but this solution is by no means inexpensive. Quantity production of ferrite powders was difficult both technically and economically according to the conventional wet method and reduction to industrial application of the method has not been very successful.

To summarize, prior spinel type ferrites may be broadly classified into the following two categories: Aggregate particles of anisotropic shape more than several microns in size, prepared by the dry method and fine ferrite particles of isotropic shape, less than 0.05 micron in size, prepared by the wet method. The former was poor in the dispersibility while the latter was not only poor in the dispersibility, but also expensive.

Accordingly, an object of this invention is to provide spinel type ferrite particles which are substantially isotropic and featured by good dispersibility.

Another object of this invention is to provide spinel type ferrite particles which are substantially isotropic and varying in size from 0.05 micron to 1 micron.

A still another object of this invention is to provide a method of manufacturing, on an industrial scale, spinel type ferrite particles which are substantially isotropic and excellent in the dispersibility.

This invention is based on the inventors' finding that spinel type ferrite particles characterized by improved dispersibility can be precipitated by oxidizing an aqueous solution containing ferrous ions and divalent metal ions and, more particularly, that a precipitate of spinel type ferrite particles, more than 0.05 micron in size, can be obtained by maintaining an aqueous solution at a temperature between 24° and 100° C., which contains a mixture of ferrous ions and one or more kinds of divalent metal ions in the atom ratio of 2 or more of ferrous ions to 1 of divalent metal ions and has the pH value of at least 6.5 and subjecting the solution to an oxidizing reaction. It is also the inventors' finding that ferrite particles of the isotropic shape ranging in size from 0.05 to 1.00 micron and in a dispersed state in the solution as well as in any subsequent stage can be realized for the first time by this invention. All kinds of spinel type ferrite particles prepared by this invention are isotropic such as cubic or octahedral in the external shape or at times, substantially isotropic such as rounded-off cubic or octahedral shape, as shown in FIGS. 1A to 1C which will be explained later.

Being in excess of 0.05 micron in diameter, the spinel type ferrite particles of this invention can display a number of merits such as ease of filtration and washing, no apprehension for solidification on drying after filtration, excellent dispersibility, excellent performance in many applications which comes from substantially the isotropic crystal structure, etc. A further advantage of this invention is the feasibility of economical quantity production because the ferrous salt as starting material for ferrous ions could be obtained inexpensively and in large quantities.

Now the principles of this invention together with the manufacturing method will be described in detail. At first an aqueous solution is prepared, which contains ferrous ions $Fe^{+2}$ and one or more kinds of divalent metal ions (hereinafter denoted by $M^{+2}$ for simplicity: ferrous ions should be excluded from the term "divalent metal ions") of such as $Mn^{+2}$, $Co^{+2}$, $Zn^{+2}$, or $Mg^{+2}$ in the atom ratio of 2 or more of ferrous ions to 1 of divalent metal ions and having the pH value of more than 6.5. In preparing this aqueous solution the required amount of a ferrous salt such as ferrous sulphate $FeSO_4 \cdot 7H_2O$ or ferrous chloride $FeCl_2$ and one or more kinds of divalent metal salts in the necessary amounts are dissolved in water to prepare a solution having a pH value of less than 3. To this solution is added an alkaline substance in amounts ranging from 0.55 to 3 equivalents of the acid contained in the solution, to raise the pH value of the solution to above 6.5. As an alternative metthod, a ferrous salt or a divalent metal salt (or salts) may be dissolved in an aqueous solution of a divalent metal salt (salts) or a ferrous salt, respectively, and thereafter, followed by adding an alkaline substance to the solution, or the solution may be formed by mixing together an aqueous solution of a ferrous salt and an alkaline substance and that of a divalent metal salt (or salts) and an alkaline substance. It is desirable that the metallic ion concentration of such a solution ranges from 0.05 to 0.8 mol/liter.

A precipitate of a hydroxide or hydroxides of $CdI_2$ crystal structure type results from such a solution as an intermediate product. In a particular case, oxides of metals other than iron may be precipitated. Depending on the conditions of neutralization, the precipitate may be a mixture of ferrous hydroxide $Fe(OH)_2$ and a hydroxide or hydroxides of a divalent metal or metals such as $Mn(OH)_2$, $CO(OH)_2$, $Zn(OH)_2$, or may be a mixture of $Fe(OH)_2$ and an other-than-iron metal oxide or oxides. At times, solid solution of hydroxides of $Fe^{+2}$ and $M^{+2}$ may be contained in the precipitated crystals. Each of such hydroxide precipitates will be generically denoted by $M(OH)_2$ hereinafter for simplicity. On precipitation of $M(OH)_2$ the pH of the mother solution becomes more than 6. Maintaining at a prescribed temperature between 24° C. and 100° C., the solution is oxidized in a state in which the precipitated particles are stirred up.

For oxidation, an oxidizing gas such as air or oxygen should be uniformly bubbled into the solution or irradiated with γ-rays while stirring the solution until the process is accomplished. By this process, $Fe^{+2}$ among the $Fe^{+2}$ and $M^{+2}$ ions which have been dissolved in the solution in equilibrium with $M(OH)_2$ is mainly oxidized and particles entirely different from $M(OH)_2$ and containing ferric ions $Fe^{+3}$ are precipitated in the solution. By this latter precipitation, the deficiency of $Fe^{+2}$ and $M^{+2}$ ions in solution is compensated for in the solution continuously by the solution of the hydroxide precipitate $M(OH)_2$ into the mother solution as oxidation progresses. Consequently the hydroxide precipitate gradually dissolves into the solution and eventually vanishes. Thus only the above-mentioned particles containing $Fe^{+3}$ remain as a precipitate.

The chemical composition, crystal structure, and the particle size of the precipitate containing $Fe^{+3}$ are entirely governed by various conditions under which the reaction takes place. For instance, the precipitated particles may be in any one of the following forms:

(i) Substantially isotropic spinel type ferrite particles containing the $F^{+3}$ and $M^{+2}$ ions in the same ratio as in the mother solution and expressed by a generalized formula as $$M_{1-x}Fe_{2+x}O_4 \ (1 > x \geqq 0);$$

(ii) Substantially isotropic spinel type ferrite particles containing the $Fe^{+3}$ and $M^{+2}$ ions in a different ratio from that in the mother solution;

(iii) (a) Metal oxyhydrates such as α-FeOOH, γ-FeOOH, or MnOOH;
 (b) Metal hydroxides such as $Mg(OH)_2$, $Zn(OH)_2$, or $CO(OH)_2$;

(c) Metal oxides such as ZnO, $MnO_2$, $Mn_3O_4$, or α-$Fe_2O_3$;

(iv) A mixture of (ii) and (iii) above.

Among the conditions affecting the kinds of precipitates and the growth of ferrite particles in the reaction are the following:

(i) Ratio in amounts of an alkali to the acid radical in the mother solution or the pH of the mother solution after addition of an alkali;
(ii) Temperature of the mother solution;
(iii) Kinds of cations present in the mother solution;
(iv) Kinds of anions present in the mother solution and their concentrations;
(v) Process of oxidation for the mother solution. For instance, how vigorously the $M(OH)_2$ precipitate is stirred up; how high is the partial pressure of oxygen in the oxidizing gas; how high is the speed of bubbles or how fine are the bubbles passing the solution.

Of these conditions, (i) and (ii) have been found to be the most influential for the formation of the ferrite precipitate. By "kinds of cations" mentioned in (iii) above are meant one or more kinds of divalent metal ions $M^{+2}$ and alkaline ions to be added. Both the former and the latter ions have an appreciably small effect on the pH and on the temperature ranges for the formation of a desired ferrite. However, these pH and temperature ranges become broader depending on the kind of alkaline ions or, more specifically, according to the addition of KOH, NaOH and LiOH. It has also been proven that the condition (iv) has a slight effect on the pH and the temperature ranges for the ferrite formation when the pH value is less than about 10 and that the condition (v) has also a slight effect on these ranges but rather appreciable effect on growth of particle.

The principles and advantages of this invention will become readily apparent from the following detailed description with the specific examples of this invention when considered in conjunction with the accompanying drawings in which:

FIGS. 1 A to C are electron microscope photographs of the external shapes of spinel type ferrite particles of this invention;

FIGS. 2 A through C are graphs showing the relation between the kinds of precipitates produced and the above-mentioned conditions (i) and (ii);

FIGS. 3 A through C show electron microscope photographs of precipitates from the same solution containing $Mn^{+2}$ and $Fe^{+2}$ under varying conditions for the reaction;

FIGS. 3 D through F show electron microscope photographs of various kinds of ferrite particles of this invention precipitated under the same conditions for the reaction;

Figure 6C:
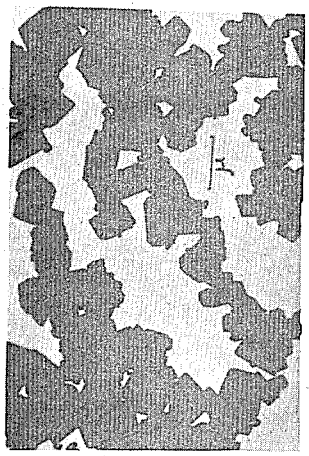
Figure 6B:
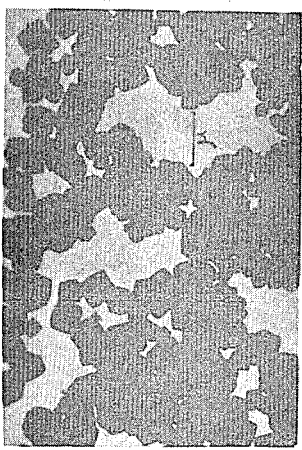

FIGS. 6 A through C show electron microscope photographs of manganese ferrite particles according to this invention produced from solutions having various ratios of $Mn^{+2}$ to $Fe^{+2}$ under the same conditions for reaction.

Figure 1C:
Figure 1B:
Figure 1A:

Referring to FIG. 1, it should be understood that spinel type ferrite particles produced by this invention are substantially isotropic in the external shape without exception, though they vary in size extensively depending on the reaction conditions in production and on their chemical composition. Photographs of FIGS. 1 A through C look as if the particles were assembled together to make contact, but actually they are loose assemblies of unit particles or single-crystals and they should not be construed a firmly bonded aggregates.

As to how the kinds of precipitates from mother solutions containing ferrous ions $Fe^{+2}$ and one kind of divalent metal ions $M^{+2}$ in the atom ratio of 2:1 are affected by the previously mentioned reaction conditions (i) and (ii) will be analyzed in conjunction with FIGS. 2 and 3.

Figure 2A:
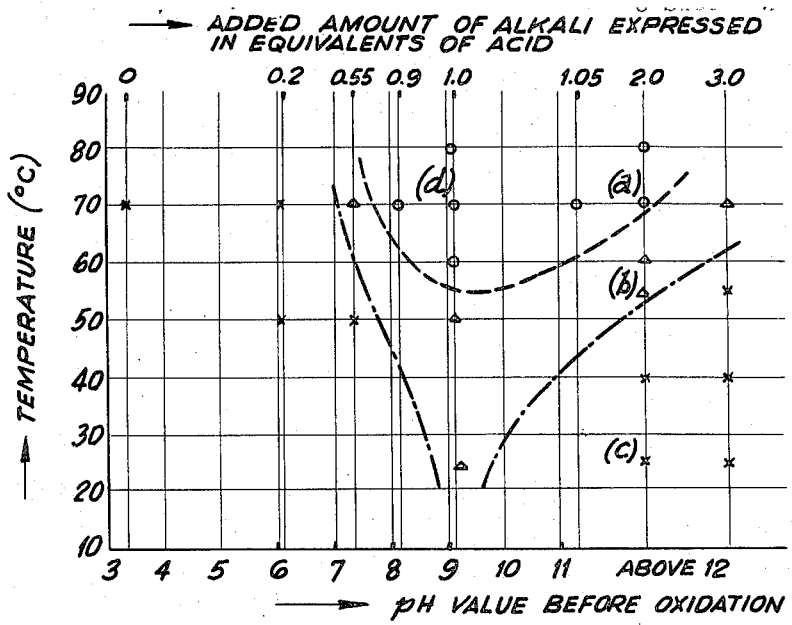

FIG. 2A is a diagrammatical representation of the following Example 1 on the formation of manganese ferrites having the constituency indicated by

$Mn_{1-x}Fe_{2+x}O_4$ $(0 \leq x < 1)$ according to this invention:

Example 1

200 grams of ferrous sulfate $FeSO_4 \cdot 7H_2O$ and 86.8 grams of manganese sulfate $MnSO_4 \cdot 5H_2O$ were weighed and dissolved in about 2 liters water to prepare an aqueous solution containing ferrous ions $Fe^{+2}$ and manganese ions $Mn^{+2}$ in the atom ratio of 2:1. To the solution sodium hydroxide NaOH was added in varying amounts. Then the total volume was diluted with water to 3.5 liters. The solution thus prepared and containing the whitish hydroxide precipitate was maintained at various temperatures between 15° C. and 90° C. and oxidized by bubbling air into the solution for 20 hours at the rate of 200 liters per hour, which air had been passed through a concentrated potassium hydroxide solution. The precipitate resulting from this process was washed with water and dried by heating at about 80° C. to obtain samples of powder form. The crystal structure and the morphological properties of the sample particles were studied by means of X-ray analysis, infrared-absorbed spectrum, and observation under an electron microscope. The experimental result is shown in FIG. 2A.

Figure 3C:
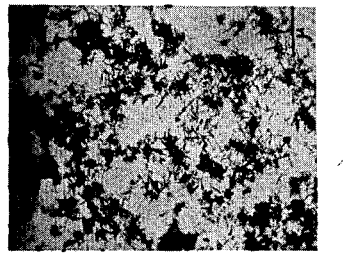
Figure 3B:
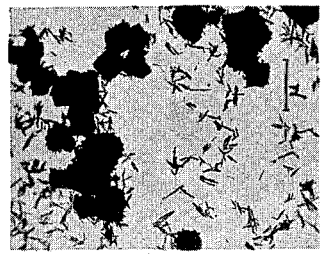
Figure 3A:

In FIG. 2A, both the ratio of normal concentration of added NaOH to that of total amounts of constituent $SO_4$ contained in the solution and the pH of the solution before the oxidation are taken as the abscissa and the oxidizing temperature is taken as the ordinate. Small circles are plots of the pH values and the oxidizing temperatures at which spinel type manganese ferrite particles substantially isotropic and varying in size from 0.12 to 1.1 microns were obtained according to Example 1. The larger the pH value of the solution—that is, the larger the added amounts of the alkali, the larger was the ferrite particle size. The range above the dashed curve in FIG. 2A is that of the reaction conditions for the formation of such ferrite particles. FIG. 3A shows an electron microscope photograph of the ferrite particles formed under the conditions indicated by point (a) in FIG. 2A. Each of the crosses (XX) in FIG. 2A represents the conditions under which a precipitate of an oxyhydrate or oxyhydrates of needle-like shape was obtained. The region in FIG. 2A below the dot-dash curves is for precipitation of an oxyhydrate or oxyhydrates. FIG. 3C is an electron microscope photograph of such precipitate having the same crystal structure as $\alpha$-FeOOH according to X-ray analysis that was formed under the condition of point (C) in FIG. 2A. Each of the triangles in FIG. 2A represents the conditions under which precipitation of a mixture of spinel type manganese ferrite particles ranging in size from 0.08 to 0.9 micron and oxyhydrates of needle-like shape was obtained. The intermediate region between the dashed curve and the dot-dash curve in FIG. 2A is for precipitation of a mixture of ferrite particles and an oxyhydrate or oxyhydrates. FIG. 3B is an electron microscope photograph of a precipitate formed under the condition of the point (b) in FIG. 2A.

FIG. 2A demonstrates clearly that a spinel type ferrite is available from a solution containing ferrous ions $Fe^{+2}$ and manganese ions $Mn^{+2}$ in the atom ratio of 2 to 1 at the reaction temperature of at least more than 25° C. and at the pH value prior to oxidation of at least more than 7.0.

Figure 2B:
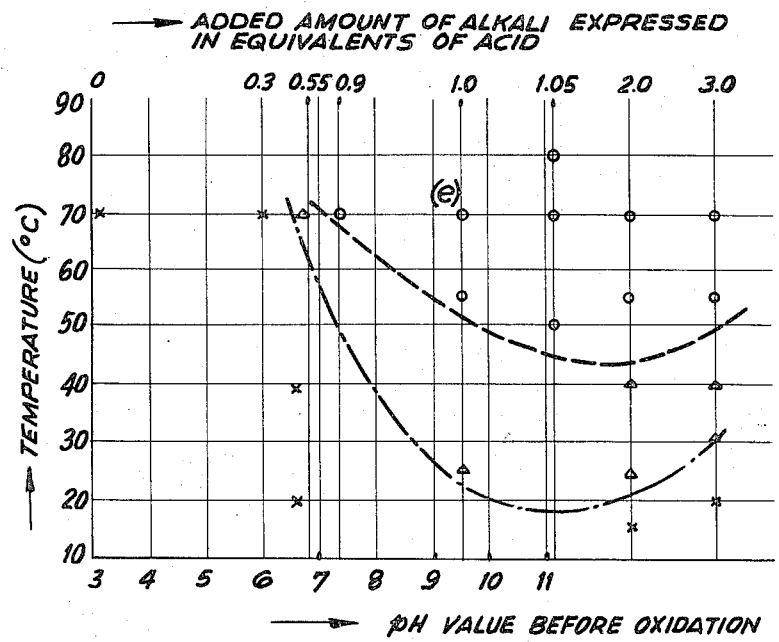

FIG. 2B is a similar representation as FIG. 2A of an experimental result obtained by treating in the same way as Example 1 an aqueous solution containing ferrous ions $Fe^{+2}$ and cobalt ions $Co^{+2}$ in the atom ratio of 2 to 1 which solution is prepared by dissolving 200 grams of $FeSo_4 \cdot 7H_2O$ and 101 grams of $CoSO_4 \cdot 7H_2O$ in about 2 liters water. The size of precipitated spinel type cobalt ferrite particles ranged from 0.08 to 1.0 micron. It will be obvious from FIG. 2B that precipitates of cobalt ferrite are obtained at temperatures above 25° C. and at pH values above 6.7.

Figure 2C:
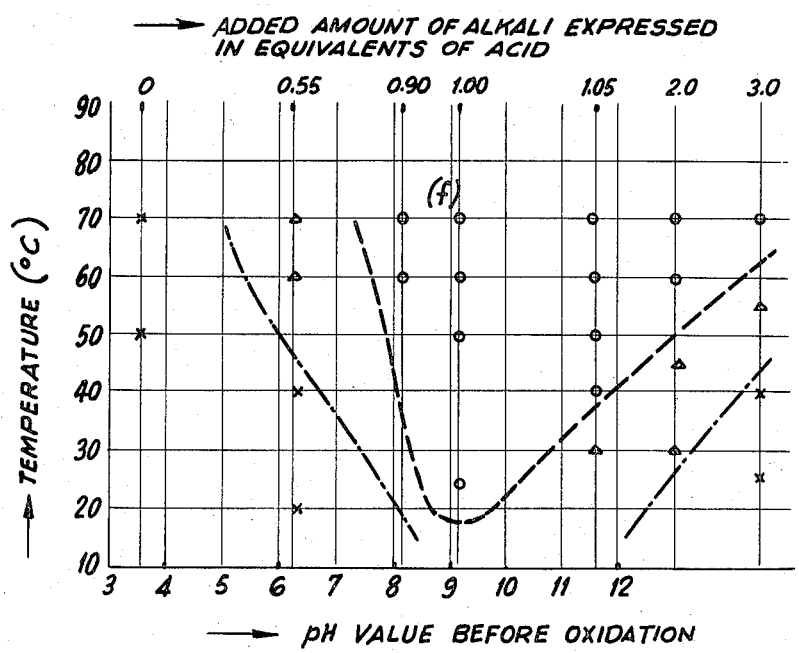

FIG. 2C is also a similar representation as FIG. 2A of an experimental result obtained by treating in the same manner as Example 1 an aqueous solution containing $Fe^{+2}$ and $Zn^{+2}$ ions in the atom ratio of 2 to 1 which was prepared by dissolving 200 g. of $FeSO_4 \cdot 7H_2O$ and 103.5 g. of $ZnSO_4 \cdot 7H_2O$ in about 2 liters water. The size of precipitated spinel type zinc ferrite particles ranged from 0.06 to 0.45 micron. That zinc ferrite particles precipitate at reaction temperatures above 24° C. and at pH values above 6.5 will be also obvious from this diagram. In the foregoing examples, both the concentration of the solution and the oxidizing speed were made constant. This was the reason why the particle sizes of precipitated spinel type ferrite were more than 0.06 micron. The size of ferrite particles will become 0.05 micron at a minimum under the same reaction state if the concentrations of these metallic ions are diluted and the oxidizing speed is made fast to quicken the growth of the particles.

Reference to FIGS. 2A through 2C readily reveal that spinel type ferrite particles, more than 0.05 micron in size, precipitate direct from a solution containing ferrous ions and one kind of divalent metal ions $M^{+2}$ in the atom ratio of 2 to 1 at reaction temperatures higher than 24° C. and at pH values more than 6, although the temperature and the pH value are more or less subject to change by the kind of $M^{+2}$ ions.

Figure 3F:
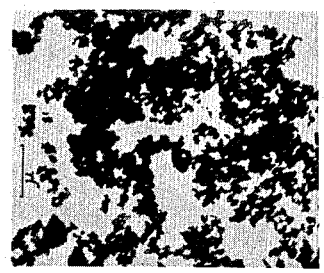
Figure 3E:
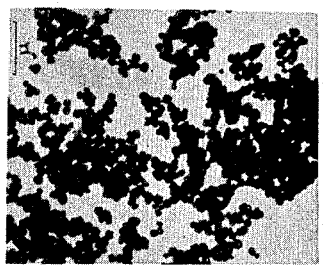
Figure 3D:
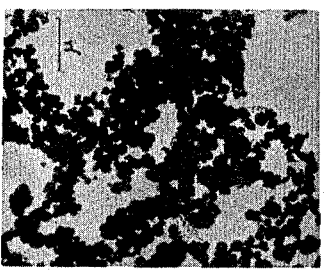

FIGS. 3D, 3E and 3F show respectively electron microscope photographs of Mn ferrite, Co ferrite, and Zn ferrite which were produced by oxidizing at 70° C. a mother solution to which an alkaline substance in amounts corresponding to one equivalent of acid had been added. It will be understood that the conditions under which thesee ferrites were formed correspond respectively to point $(d)$ in FIG. 2A, point $(e)$ in FIG. 2B, and point $(f)$ in FIG. 2C.

The above explanations have related to the reaction conditions under which either at least ferrite particles or only ferrite particles precipitate. Now let us proceed to a study of the influence of the reaction conditions on the chemical composition of spinel type ferrite particles to be precipitated—that is, on the atom ratio of iron ions to divalent metal ions $M^{+2}$ in the precipitated particle.

Example 2

An aqueous solution containing $Fe^{+2}$ and $Mn^{+2}$ ions in the atom ratio of 2:1 was prepared at first by dissolving 200 g. of $FeSO_4 \cdot 7H_2O$ and 86.8 g. of $MnSO_4 \cdot 5H_2O$ in about 2 liters water. To this solution was added NaOH in varying amounts to obtain a whitish precipitate. In the next place, the total volume was diluted with water to 3.5 liters. Then air was bubbled into the solution kept at a temperature within 70° C.±0.5° C. at the rate of 300 liters per hour for 20 hours. This caused the whitish precipitate as an intermediate product to be diminished gradually and to be superseded by a precipitate of spinel type ferrite particles. At the conclusion of this process, the intermediate precipitate disappeared. The precipitate of spinel type manganese ferrite particles was then filtered off, washed with water, and dehydrated with alcohol in succession and finally, dried up under a reduced pressure at temperature of 40° C. to obtain powdery form. Table 1 indicates the chemical compositions (i.e. the atom ratios Mn/Fe) and particle sizes of various sample powders thus prepared.

Similar experiments were also conducted to obtain cobalt ferrite and zinc ferrite particles by weighing 101.0 g. $CoSO_4 \cdot 7H_2O$ and 103.0 g. $ZnSO_4 \cdot 7H_2O$ in lieu of 86.6 g. $MnSO_4 \cdot 5H_2O$ and subjecting similar aqueous solutions to exactly the same chemical reaction. The result is also tabulated in Table 1.

Incidentally, by "change in pH" in Table 1 is meant the change in the pH value of the solution containing $M^{+2}$ and $Fe^{+2}$ ions in the atom ratio of 1 to 2 from the time of adding the alkaline solution to the time of accomplishing 20-hour oxidation with the reaction temperature kept at 70° C.

TABLE 1

| $n=2[OH]/[SO_4]$ | 0.55 | 0.90 | 1.00 | 1.05 | 2.00 | 3.00 |
|---|---|---|---|---|---|---|
| Mother solution in which $Mn^{+2}/Fe^{+2}$ ratio is 0.5: | | | | | | |
| Change in pH | 7.3→2.9 | 8.1→6.0 | 9.1→6.2 | 11.3→10.4 | >12 | >12 |
| Mn/Fe ratio in precipitated ferrite particles | *0.04 | 0.34 | 0.48 | 0.49 | 0.50 | *0.50 |
| Size of Mn. Ferrite particles (in micron) | 0.19 | 0.20 | 0.17 | 0.22 | 0.57 | 1.07 |
| Mother solution in which $Zn_n^{+2}/Fe^{+2}$ ratio is 0.5: | | | | | | |
| Change in pH | 6.5→2.6 | 8.1→3.2 | 9.1→4.7 | 11.0→10.9 | ---------- | >12 |
| Zn/Fe ratio in precipitated ferrite particles | *0.29 | 0.44 | 0.48 | 0.50 | ---------- | 0.50 |
| Size of Zn. Ferrite particles (in micron) | 0.09 | 0.12 | 0.13 | 0.17 | ---------- | 0.45 |
| Mother solution in which $Co^{+2}/Fe^{+2}$ ratio is 0.5: | | | | | | |
| Change in pH | 6.7→2.4 | 7.3→5.2 | 9.5→6.0 | 11.2→10.7 | ---------- | >12 |
| Co/Fe ratio in precipitated ferrite particles | *0.10 | 0.33 | 0.48 | 0.50 | ---------- | *0.50 |
| Size of Co. Ferrite particles (in micron) | 0.15 | 0.15 | 0.19 | 0.27 | ---------- | 0.97 |

NOTE.—Figure bearing (*) denotes a precipitate in the form of a mixture of ferric oxyhydrate and spinel type ferrite, whereas figure without (*) denotes a precipitate composed of spinel type ferrite only.

As will be evident from Example 2, almost all $Fe^{+2}$ and $M^{+2}$ ions in the mother solution are precipitated as constituents of the precipitated ferrite with the same atom ratio of $Fe^{+2}/M^{+2}$ as in the solution preserved, provided the amount of an alkaline solution added is larger than one equivalent of acid and the pH of the mother solution after oxidation at least exceeds 10. If the amount of an alkaline solution is less than this, not all of $Fe^{+2}$ and $M^{+2}$ ions precipitate from the solution when the pH value before oxidation ranges from 5 to 9 and the chemical composition of the precipitated ferrite particles is generally expressed as $$M_{1-x}Fe_{2+x}O_4 \quad (0<x<1).$$

The following fact was confirmed when ammonia was used in lieu of NaOH. In case a ferrite precipitate containing a divalent metal or metals having the tendency of forming the complex ion of ammonia, the $M^{+2}$ ions in the mother solution enter but partly into the precipitate and remain partly in the solution, provided the pH of the solution exceeds 8.

Although the reaction temperature was near 70° C. according to Example 2, our extensive experimentation conducted on a larger scale indicated that the most appropriate temperature range for precipitation of ferrites in large quantities was 65° C.-80° C.

A description has been made of cases above where the atom ratio of $Fe^{+2}$ to one kind of $M^{+2}$ in the mother solutions was 2. Reference will now be made to those cases where the ratio is otherwise with attention directed to FIGS. 4 through 6.

One numerous experiments revealed that for the ratios more than 2 the precipitated ferrite particles consisted of only spinel type ferrite and the ratio in the precipitate was substantially the same as in the solution and had a generalized empirical formula indicated below, subject to the conditions that the reaction temperature range to be 650° C.-80° C. and the addition of an alkaline substance to be more than one equivalent of acid:

$$M_{1-x}Fe_{2+x}O_4 \quad (0<x<1.0)$$

Where the atom ratio of $Fe^{+2}/M^{+2}$ in the mother solution was less than 2 under the same conditions, the precipitate was a mixture of a ferrite $MFe_2O_3$ and a hydroxide (or hydroxides) or an oxide (or oxides) of excess M. Variation in size of spinel type ferrite particles with the kind of $M^{+2}$ was relatively small.

Now a particular case where a zinc ferrite $$Zn_{1-x}Fe_{2+x}O_4$$

is produced will be described in Example 3.

Example 3

300 g. of FeSO$_4$.7H$_2$O and varying amounts of $$ZnSO_4.7H_2O$$

from 50 g. to 350 g. were dissolved in about 2 liters water. To these solutions containing Fe$^{+2}$ and Zn$^{+2}$ in various ratios, sodium hydroxide in amounts corresponding to 1.05 equivalents of the sulphate radical was added respectively and each solution was diluted to 3.5 liters by water. With these solutions maintained at a temperature within 65° C.±0.5° C., air was bubbled into for 10 hours at the rate of 500 l./hr. All precipitates were ferrite and the precipitated ferrite particles ranged from 0.1 to 0.12 micron in size. The chemical and physical properties of samples obtained by subjecting the precipitates to filtering, washing, dehydrating, and drying processes are tabulated in Table 2.

was added respectively and the solutions were subjected to an oxidizing process at the reaction temperature between 30° C. and 70° C. It was confirmed that all of the Fe$^{+2}$ and the Co$^{+2}$ ions were precipitated, each precipitate was a solid solution of spinel type cobalt ferrite particles Co$_{1-x}$Fe$_{2+x}$O$_4$, or a solid solution of Fe$_3$O$_4$ and CoFe$_2$O$_4$, and the particle size ranged from 0.08 to 0.50 micron.

Figure 4:
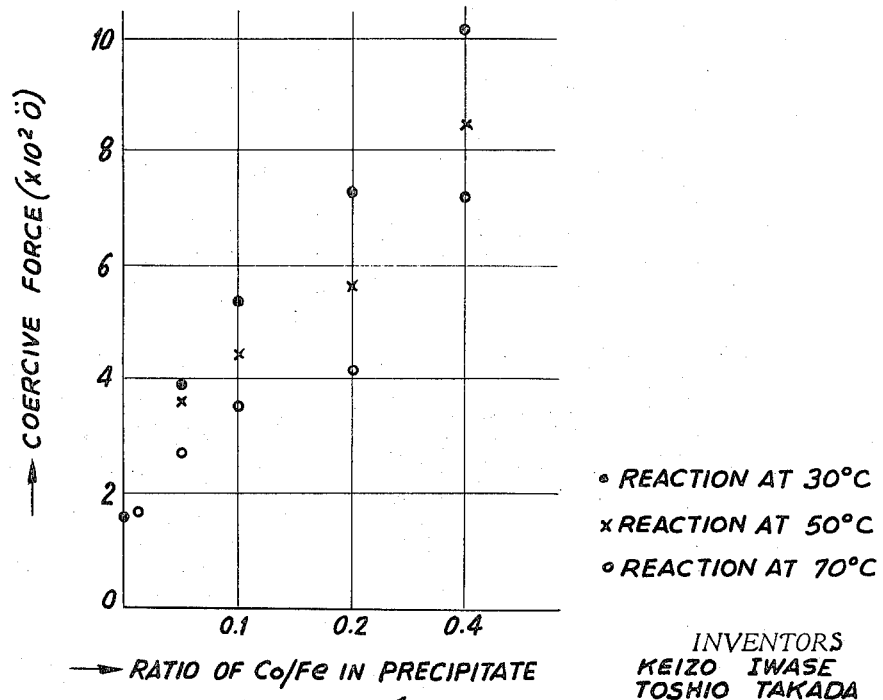
FIG. 4 is a diagram illustrating the coercive force of cobalt ferrite particles as a function of the amount of the cobalt ion contained therein.

The manner in which the coercive force of the produced cobalt ferrite varies with the contents of cobalt in the ferrite is shown in FIG. 4. The ordinate and the abscissa represent respectively the coercive force measured under a magnetic field intensity of 3,600 oersteds and the ratio in number of cobalt to iron atoms in the precipitated cobalt ferrite particles. Variation of the coercive force with cobalt contents is attributable, it is consindered, to changes in the magnetocrystalline energy of the cobalt ferrite with the value of $x$. Even if the cobalt contents remain unchanged, the coercive force still varies with the reaction temperature. For instance, particle size varied from about 0.08 to 0.5 micron for the reaction temperature range 30° C.–70° C. Therefore, the reaction temperature has a

TABLE 2

| Mother solution | | | Precipitate | | | | | Precipitate fired in air at 400°C. | | |
|---|---|---|---|---|---|---|---|---|---|---|
| FeSO$_4$·7H$_2$O added, g. | ZnSO$_4$·7H$_2$O added, g. | Fe$^{+2}$:Zn$^{+2}$ Atom (atom ratio) | Fe:Zn (atom ratio) | Result from X-ray analysis | Color | Magnetic property | Chemical composition | Chemical composition | Color | Magnetic property |
| 300 | 50 | 6.25:1 | 6.45:1 | Znferrite | Dark brown. | Ferromagnetic. | Zn$_{0.4}$Fe$_{2.6}$O$_4$ | Zn$_{0.4}$Fe$_{2.6}$O$_{4.3}$ | Dark brown. | Ferromagnetic. |
| 300 | 100 | 3.13:1 | 3.17:1 | do | do | do | Zn$_{0.27}$Fe$_{2.28}$O$_4$ | Zn$_{0.72}$Fe$_{2.28}$O$_{4.14}$ | do | Do. |
| 300 | 160 | 1.91:1 | 1.98:1 | Znferrite +ZnO. | Brown | Non-ferromagnetic. | Zn$_{1.0}$Fe$_{2.0}$O$_4$ +ZnO | Zn$_{1.0}$Fe$_{2.0}$O$_4$ +ZnO | Brown | Non-ferromagnetic. |
| 300 | 200 | 1.56:1 | 1.55:1 | do | do | do | Zn$_{1.0}$Fe$_{2.0}$O$_4$ +ZnO | Zn$_{1.0}$Fe$_{2.0}$O$_4$ +ZnO | do | Do. |
| 300 | 350 | 0.84:1 | 0.89:1 | do | do | do | Zn$_{1.0}$Fe$_{2.0}$O$_4$ +ZnO | Zn$_{1.0}$Fe$_{2.0}$O$_4$ +ZnO | Light brown. | Do. |

Table 2 indicates that zinc ferrites of the spinel type crystal structure having a generalized formula $$Zn_{1-x}Fe_{2+x}O_4$$

precipitate from the solutions in which the atom ratio of Fe$^{+2}$/Zn$^{+2}$ is more than 2. As the ratio approached 2, the lattice constant of the ferrite particles varied from 8.39 to 8.42 angstroms and physical characteristics such as magnetic property and color tone varied accordingly. The substance having the constituency indicated by $$Zn_{1-x}Fe_{2+x}O_4$$

is considered to be a solid solution of the Fe$_3$O$_4$-ZnFe$_2$O$_4$ base. By heating at a temperature below 400° C. in an oxidizing atmosphere, Zn$_{1-x}$Fe$_{2+x}$O$_4$ powder is converted into brown zinc ferrite powder of the defect type $$Zn_{1-x}Fe_{2+x}O_{4+0.5x}$$

which is ferromagnetic and probably a solid solution of the γ-Fe$_2$O$_3$-ZnFe$_2$O$_4$ base. If fired at a temperature above 400° C., a mixture of ZnFe$_2$O$_4$ and α-Fe$_2$O$_3$ obtains, which is reddish yellow and not so strongly magnetic. From mother solutions in which the ratio is less than 2, a mixture of ZnFe$_2$O$_4$ and ZnO results.

Similar tendency as mentioned previously could be observed for the precipitates of other-than-zinc ferrites. For instance, to mother solutions each containing more than 2 iron ions per 1 cobalt ion, an alkaline solution in amounts more than one equivalent of the acid radical direct bearing on the particle size. On firing in an oxidizing atmosphere, the precipitated particles Co$_{1-x}$Fe$_{2+x}$O$_4$ were oxidized to spinel type ferrite particles ranging in sizes from 0.08 to 0.50 micron and in the form of solid solution of γ-Fe$_2$O$_3$ and CoFe$_2$O$_3$, the coercive force increased, and the ferrite was converted to a mixture of α-Fe$_2$O$_3$ and CoFe$_2$O$_4$ at temperatures above 500° C.

For changes in the ratio Fe$^{+2}$/M$^{+2}$ in excess of 2, the dotted curves in FIGS. 2A through C should be transformed from the illustrated shapes, respectively. Now the manner of transformation will be analyzed.

Figure 5:
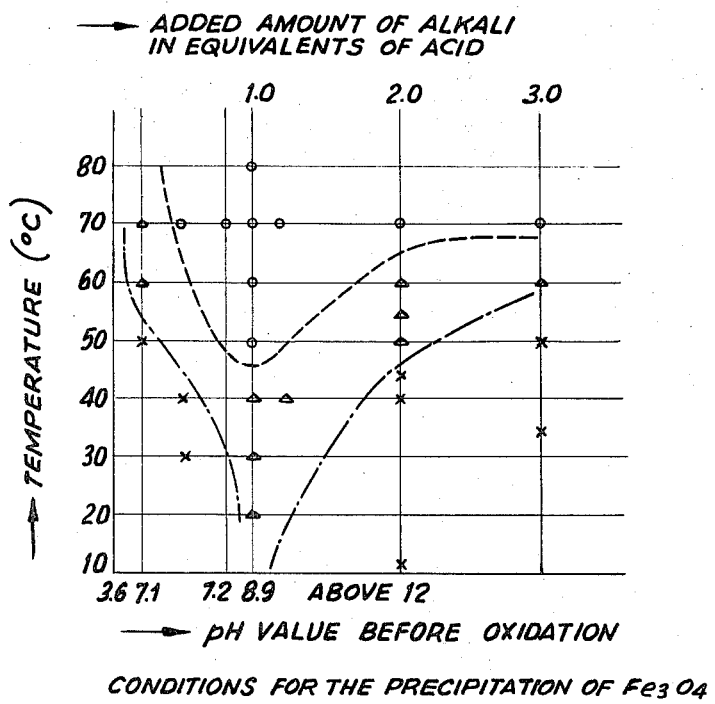
FIG. 5 is a graph showing the relation between kinds of precipitates expected from starting solutions containing only ferrous ions and the conditions for reaction.

FIG. 5 illustrates various kinds of precipitates to be obtained from aqueous solutions of FeSO$_4$ containing no divalent metallic ions (or extreme case where M$^{+2}$=0, namely the ratio Fe$^{+2}$/M$^2$ becomes infinite) under the following chemical process:

To aqueous solutions of FeSO$_4$, NaOH in varying amounts from 0.1 to 3.0 equivalent of the sulphate radical SO$_4$ was added respectively; these solutions, 3.5 liters in volume and in which the Fe$^{+2}$ concentration was 0.208 mol, were maintained at temperatures between 10° C. and 80° C.; air was bubbled into each solution at the rate of 200–500 l./hr.; the reaction was advanced until Fe(OH)$_2$ disappeared.

Small circles in FIG. 5 denote the conditions under which Fe$_3$O$_4$ precipitated, the range thereof being above the dashed curve; crosses denote the conditions under which FeOOH was obtained, the range thereof being below the dot-dash curves; and black triangles denote the conditions under which a mixture of the two compounds precipitated, the range thereof being the intermediate zone between the two curves. The abscissa and the ordinate of FIG. 5 are taken the same as in FIG. 2.

As a result of many experiments, the present inventor has reached the conclusion that with changes in the value of the ratio $Fe^{+2}/M^{+2}$ from 2 to infinity, the dashed curve in each of FIGS. 2A through C transforms its shape to become eventually the dashed curve in FIG. 5. This holds true for the dot-dash curves. This fact confirms that the reaction conditions under which spinel type ferrites precipitate from the mother solution containing the ions in the ratio $Fe^{+2}/M^{+2}$ of more than 2 are limited not to the above-described conditions but to the ranges above the dot-dash curves of transforming figures between FIG. 2 and FIG. 5.

Figure 6A:
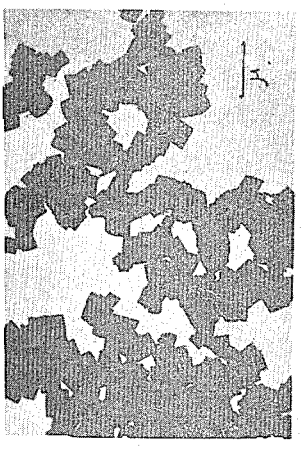

FIGS. 6A, B, and C show the electron microscope photographs of Mn ferrite particles obtained by adding respectively an alkaline substance in amounts corresponding to 2 equivalents of acid to aqueous solutions containing $Fe^{+2}$ and $Mn^{+2}$ ions in atom ratios of 2:1, 3.3:1, and 20:1, respectively and oxidizing the resulting solutions at 70° C.

Although a description has been made of cases in which one of $Mn^{+2}$, $Co^{+2}$, and $Zn^{+2}$ is selected as $M^{+2}$, it was experimentally verified that similar experimental results could be obtained with any other divalent metal ion ($M^{+2}$) such as $Mg^{+2}$ ions. For example, spinel type ferrite particles precipitated from mother solutions containing two or more atoms of ferrous ion per one atom of $Mg^{+2}$ at the reaction temperature 24° C.–100° C. and at the pH value of more than 6.5. Although Mg ferrite precipitates were obtained by subjecting mother solutions containing $Mg^{+2}$ to an oxidizing process in the pH range 7–12 and at temperatures above 60° C., it was difficult to cause all $Mg^{+2}$ ions in the solutions to precipitate.

The principle of this invention are equally applicable in cases where ferrite precipitates containing two or more divalent metals (other than iron) are to be obtained. Both the process for manufacture of such ferrite particles and the conditions for various reactions are approximately similar as for ferrite particles containing only one kind of divalent metal.

For example, in manufacturing manganese zinc ferrite, an alkaline substance, such as a hydroxide of sodium, potassium, or lithium, in amounts corresponding to 1.05 or more equivalents of acid should be added to a solution containing manganese, zinc, and ferrous ions and in which the atom ratio of ferrous ions to the sum of Mn and Zn ions is 2 or more to prepare a mother solution having the pH value of more than 10 and then, the solution is subjected to an oxidizing process by bubbling air therein at a temperature above 60° C. Then all of $Fe^{+2}$, $Mn^{+2}$, and $Zn^{+2}$ ions in the mother solution having the pH value of more than 8.8 after the oxidation precipitate therefrom as the precipitation of spinel type ferrite and do not remain in the solution. Depending on the reaction conditions, size of the precipitated ferrite particles ranged from 0.05 to 1.00 micron.

Mn-Co and Co-Zn ferrites may be manufactured in a similar manner. Most favorable reaction conditions for the former ferrite were 65° C.–80° C. (oxidation temperature) and more than 8.8 (pH value of the solution after adding an alkaline substance) and the precipitated particle size ranged from 0.05 to 1.0 micron whereas those for the latter ferrite were 65° C.–80° C., more than 6.8 and 0.05–1.0 micron. For a temperature and a pH value less than the abovementioned, the precipitation of spinel type ferrite at least could be observed. Similarly spinel type ferrite other than Mn-Zn ferrite, such as Mg-Zn ferrite, or Mg-Mn ferrite, more than 0.05 micron in size, could be precipitated by selecting the similar atom ratio and under the substantially similar reaction conditions.

An illustrative example for the preparation of Mn-Zn, Mn-Co, and Co-Zn ferrite particles is given as follows.

Example 4

630.1 grams of manganese sulfate $MnSO_4 \cdot H_2O$, 600.1 grams of zinc sulfate $ZnSO_4 \cdot 7H_2O$, and 3600 grams of ferrous sulfate $FeSO_4 \cdot 7H_2O$ were weighed and dissolved in 30 liters of 0.01N sulfuric acid $H_2SO_4$ while 1834.5 grams of sodium hydroxide NaOH was dissolved in 20 liters water. The two solutions were mixed together and diluted with water to 70 liters. The ion proportions in this mother solution should be $$Fe^{+2}:Mn^{+2}:Zn^{+2}=2.058:0.604:0.338$$

or $Fe^{+2}:(Mn^{+2}+Zn^{+2})=2.18:1$ as expressed by the previously mentioned atom ratio.

Then keeping the mother solution at 70° C., air purified by concentrated KOH was bubbled into the solution at the rate of 500 l./hr. This oxidation process should be performed in such a manner that whitish hydroxide precipitates are uniformly dispersed in the solution. After the time elapse of 20 hours, the hydroxide precipitate disappeared and dark brown Mn-Zn ferrite particles precipitated in the mother solution having the pH of 9.8.

The ferrite precipitate was filtered off, washed with water, dehydrated with alcohol, and pulverized at a temperature below 40° C. under a reduced pressure in succession. The chemical composition of the ferrite thus prepared was found to be as follows:

$$Mn_{0.604}Zn_{0.338}Fe_{2.058}O_4$$

The particle size of the product was 0.054 micron according to X-ray analysis while it was 0.065 micron (surface area: 19.0 m.$^2$/g.) according to computation by the BET method.

Example 5

1440 ml. of a 0.721 M solution of ferrous chloride, 143 ml. of a 0.501 M solution of cobalt chloride, and 72 ml. of a 0.250 M solution of manganese chloride were mixed together and to the mixed solution 1700 ml. of a 1.02 N NaOH solution was added. The ion proportions in this solution should be $Fe^{+2}:Co^{+2}:Mn^{+2}=100:10:2.5$ or $Fe^{+2}:(Co^{+2}+Mn^{+2})=8:1$ as expressed by the atom ratio.

The mixed solution was diluted with water to 3,500 ml. Then air was bubbled into the mother solution containing a whitish precipitate and having the pH value of 12.3 at the rate of 500 l./hr. for 15 hours with the solution maintained at 70° C. A blackish precipitate thus obtained from the mother solution having the pH value of 10.3 was filtered off, washed with water, dehydrated with alcohol, and pulverized at 40° C. under a reduced pressure. The pulverized Mn-Co ferrite product had the atom ratio of Fe:Co:Mn=100:10.0:2.5 while the average particle size and the coercive force were 0.18 micron and 310 oersteds, respectively.

As a result of performing similar chemical reactions as mentioned above by varying the amount of a 0.25 M manganese chloride solution to be added, it was discovered that the metal ion proportions in ferrite particles precipitated from solution having pH values of more than 10 conformed to those in mother solutions and the coercive force varied with increase of the proportion of Mn. For instance, the coercive force of ferrite particles having the atom ratio Fe:Co:Mn=100:10:20 was approximately 150 oersteds.

Example 6

1,440 ml. of a 0.721 M solution of ferrous chloride, 143 ml. of a 0.501 M solution of cobaltous chloride, and 142 ml. of a 0.125 M solution of zinc chloride were mixed together and to this solution 1,680 ml. of a 1.02 N solution of NaOH was added. The solution was diluted with water to 3,500 ml. to prepare a mother solution (pH=11.8). The metal ion proportions in the mother solution should be $Fe^{+2}:Co^{+2}:Zn^{+2}=100:10.0:5.0$, that is, 100/15 or 6.7 to 1.

With the mother solution maintained at 70° C., air was bubbled in at the rate of 350 l./hr. for 14 hours.

A black precipitate formed in the mother solution (pH=10.2) was filtered off and pulverized. The product was found to be spinel type Zn-Co ferrite containing the metal ions in the same proportions as in the mother solution. The particle size and the coercive force of the product were 0.18 micron and 380 oersteds, respectively.

From extensive experimentation conducted by the inventors, it can be concluded that the reaction conditions affect the particle growth as follows:

(i) The larger the amount of addition of an alkaline substance, the bigger the particles tend to grow. This will be obvious by reference to Table 1.
(ii) The higher the reaction temperature, the bigger the particles tend to grow.
(iii) The slower the rate of oxidation (for example, the lower the partial pressure of oxygen in a gas, or the smaller the speed of a gas bubbled into a solution), the bigger the particles tend to grow.
(iv) The larger the amount of a hydroxide precipitate in unit volume produced after addition of an alkaline substance, the faster the particle growth.
(v) The larger the precipitated particles of a hydroxide precipitate after addition of an alkaline substance, the faster the particle growth.

Of these conditions, the effect of the condition (iv) was the most pronounced.

In order to make the ferrite particles produced by this invention to a desired size, it is only necessary according to our experimental finding to introduce the precipitated particles into a new mother solution, perform the oxidizing process, and repeat the above-mentioned process cycle as many times as required. The growth of particle size is probably due to the deposition on existing particles as seeds without forming another ferrite precipitate while the intermediate hydroxide precipitate is dissolving. By repeating this cycle, the particle size may be grown up to a required value, for example 1.0 micron.

Although ferrite precipitates from first mother solutions containing one kind of divalent metal ions could be easily brought to 0.2 micron or more, those from first mother solutions containing two kinds of divalent metal ions failed to reach 0.2 micron. An example of the particle growth according to the repetition cycle method follows:

Example 7

7200 grams of ferrous sulphate, 1260.3 grams of manganese sulphate, and 1200.1 grams of zinc sulphate were weighed and dissolved in 30 liters of a 0.01 N solution of sulfuric acid to prepare an aqueous solution in which the atom ratio of the metal ions

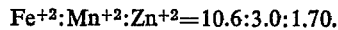
$Fe^{+2}:Mn^{+2}:Zn^{+2}=10.6:3.0:1.70.$

On the other hand, 3393 grams of sodium hydroxide was dissolved in 20 liters water. The two solutions were mixed to obtain a white hydroxide precipitate. The solution containing the precipitate was diluted to 70 liters. (Let this solution be referred to as "the starting solution" hereinafter.)

With the starting solution maintained at 70° C., air purified by conc. KOH was bubbled in at the rate of 500 l./hr. Under the condition in which the white hydroxide precipitate is uniformly dispersed in the solution, oxidation was performed. After the time elapse of 50 hours, the hydroxide precipitate was perfectly vanished and was superseded by a precipitate of Mn-Zn ferrite.

The ferrite precipitate was filtered off, washed with water, dehydrated with alcohol, and pulverized at a temperature below 40° C. under a reduced pressure. The chemical composition of the ferrite powder was found to be $Mn_{0.608}Zn_{0.339}Fe_{2.053}O_4$. The size of the particles according to X-ray measurement was 0.071 micron and the computed size from the surface area according to the BET method was 0.08 micron (surface area=15.1 m.$^2$/g).

The same starting solution was reproduced and to this solution the ferrite powder in sludge form obtained from the previous precipitation was introduced to perform oxidation under the same conditions as mentioned previously. This resulted in a Mn-Zn ferrite precipitate having the chemical composition $Mn_{0.605}Zn_{0.338}Fe_{2.057}O_4$. The particle diameter measured by X-ray analysis was a little more than 0.1 micron and the computed diameter by the BET method was 0.140 micron (surface area=8.7 m.$^2$/g).

By repeating a similar process once more, ferrite powder, 0.180 micron in size (surface area=6.6 m.$^2$/g. by BET method) and having the same composition, was obtained.

According to the present invention, it is also possible to produce ferrite particles of high purity (with each of $SiO_2$, alkali metals, and alkali earth metals less than 0.1 wt. percent as impurities) by observing the following precautions:

(1) High purification of starting materials—that is, a ferrous salt, divalent metal salt or salts or aqueous solutions of these salts.
(2) Adaption of chemically pure water and oxidizing gas.
(3) Use of reaction vessels made of stainless steel or plastic materials which will not liberate impurities.
(4) Carrying out of all of the necessary chemical processes under as clean and as dust-inhibiting circumstances as possible.

It has been found that in order to prevent alkali metal ions in a mother solution from intermingling in ferrite particles as impurities, precipitated particles need to be thoroughly washed in water, or electrodialysis of impurities absorbed on the surface of a precipitate or a treatment of a precipitate with an organic alkali employed. As a result of various precautional steps taken for ferrite particles of 0.05 micron or more in size, we have succeeded in lessening the amount of each alkali metal such as Na, K, or Li absorbed in or in solid solution state with ferrite particles below 0.02 wt. percent.

The present inventors have conducted extensive and systematic experimentation to manufacture ferrites varying in the kind of one or more $M^{+2}$ or in the constituency according to this invention to confirm that various kinds of ferrite particles different in the external shape and in the size as will be mentioned at least in the claims for patent can be obtained. It will be understood that the foregoing Examples are but a small part of such extensive experimentation. Another Example in support of the invention will be given hereinafter.

Example 8

A ferrous salt and one or two kinds of $M^{+2}$ salt were weighed and dissolved in about 30 liters water. To this solution, the required amount of an alkaline substance was added to obtain a white hydroxide precipitate. Then the solution was diluted with water to 70.0 liters. With this solution maintained at a predetermined temperature, air (or an oxygen gas) was bubbled into until the precipitate disappeared. The ferrite precipitate thus obtained was filtered off, washed in water, and dried in a nitrogen atmosphere at 60° C. The chemical compositions and sizes of ferrite powders thus obtained and the conditions for the reaction performed are summarzied in Table 3.

TABLE 3

| Starting solution (mol/l.) | | | | Condition of oxidation | | | | | Ferrite product | |
|---|---|---|---|---|---|---|---|---|---|---|
| $Fe^{+2}$ conc. | $M_I^+$ conc. | $M_{II}^{+2}$ conc. | $OH^-$ conc. | Temperature (° C.) | Kind of gas | Gas speed (l./hr.) | Time (hrs.) | pH after oxidation | Diameter (micron) | $Fe:M_I:M_{II}$ |
| ($FeSO_4$) | ($MnSO_4$) | | (NaOH) | | | | | | | (Fe:Mn) |
| 0.104 | 0.052 | | 0.322 | 65 | $O_2$ | 400 | 5 | 9.1 | 0.05 | 1:0.5 |
| 0.104 | 0.021 | | 0.258 | 65 | $O_2$ | 400 | 5 | 8.9 | 0.06 | 1:0.2 |
| 0.104 | 0.011 | | 0.239 | 65 | $O_2$ | 400 | 5 | 8.8 | 0.05 | 1:0.1 |
| 0.312 | 0.032 | | 1.376 | 73 | Air | 500 | 45 | >12 | 0.78 | 1:0.1 |
| ($FeSO_4$) | ($ZnSO_4$) | | (NaOH) | | | | | | | (Fe:Zn) |
| 0.208 | 0.104 | | 0.630 | 60 | Air | 1,800 | 8 | 9.2 | 0.07 | 1:0.5 |
| 0.208 | 0.042 | | 0.502 | 60 | Air | 1,800 | 8 | 8.8 | 0.06 | 1:0.2 |
| 0.312 | 0.062 | | 1.130 | 70 | Air | 800 | 20 | >12 | 0.25 | 1:0.2 |
| ($FeSO_4$) | ($CoSO_4$) | | (NaOH) | | | | | | | (Fe:Co) |
| 0.104 | 0.052 | | 0.321 | 58 | $O_2$ | 400 | 5 | 8.5 | 0.07 | 1:0.5 |
| 0.104 | 0.005 | | 0.219 | 58 | $O_2$ | 400 | 5 | 7.9 | 0.07 | 1:0.05 |
| 0.312 | 0.052 | | 0.925 | 75 | Air | 600 | 35 | >12 | 0.55 | 1:0.16 |
| ($FeSO_4$) | ($MgSO_4$) | | (NaOH) | | | | | | | (Fe:Mg) |
| 0.208 | 0.104 | | 0.444 | 65 | Air | 2,000 | 9 | 8.7 | 0.07 | 1:0.08 |
| 0.208 | 0.023 | | 0.577 | 65 | Air | 1,000 | 12 | >12 | 0.11 | 1:0.09 |
| ($FeSO_4$) | ($MnSO_4$) | | ($NH_4OH$) | | | | | | | (Fe:Mn) |
| 0.208 | 0.104 | | 0.630 | 70 | Air | 700 | 20 | 5.7 | 0.17 | 1:0.22 |
| ($FeSO_4$) | ($CoSO_4$) | | ($NH_4OH$) | | | | | | | (Fe:Co) |
| 0.208 | 0.014 | | 0.630 | 70 | Air | 700 | 20 | 6.4 | 0.18 | 1:0.27 |
| ($FeSO_4$) | ($ZnSO_4$) | | ($NH_4OH$) | | | | | | | (Fe:Zn) |
| 0.208 | 0.104 | | 0.630 | 70 | Air | 700 | 20 | 3.8 | 0.12 | 1:0.49 |
| ($FeSO_4$) | ($MnSO_4$) | ($ZnSO_4$) | (KOH) | | | | | | | (Fe:Mn:Zn) |
| 0.432 | 0.121 | 0.012 | 1.170 | 70 | Air | 1,500 | 18 | 8.9 | 0.07 | 1:0.357:0.036 |
| 0.432 | 0.121 | 0.012 | 1.250 | 70 | Air | 500 | 45 | 10.4 | 0.18 | 1:0.357:0.036 |
| 0.432 | 0.121 | 0.012 | 1.250 | 70 | Air | 500 | *45×2 | 10.5 | 0.27 | 1:0.357:0.036 |
| ($FeCl_2$) | ($MnCl_2$) | ($MgCl_2$) | (NaOH) | | | | | | | (Fe:Mn:Mg) |
| 0.432 | 0.216 | 0.216 | 0.910 | 70 | Air | 500 | 40 | >12 | 0.15 | 1:0.5:0.41 |

NOTE.—Asterisk (*) denotes one repetitive cycle as explained in Example 7.

It will be noted from the last column of Table 3 that the atom ratio of Fe to the divalent metals Mn, Zn, Co and Mg may range over a relatively broad range. For example, the Fe/Mn ratio may range up to 1 to 0.1 or 10:1 in addition to 20 to 1 as disclosed hereinbefore. The Fe/Co ratio is shown as 1 to 0.5 or 2 to 1, 1 to 0.05 or 20 to 1 and 1 to 0.16 or 6.22 to 1. Similarly, it will be noted that the Fe/Mg ratio may range up to 1 to 0.08 or 12.5 to 1.

As has been fully described, this invention intends to provide spinel type ferrite particles more than 0.05 micron in size, substantially isotropic in the external shape, and featured by excellent dispersibility which have not been present heretofore. It has been also experimentally verified that such ferrite particles have a wider application field and more excellent performance than the conventional ones.

In manufacturing ferrite magnets or cores by compacting and sintering ferrite particles, it has been known that the sintering temperature should be as low as possible from the viewpoint of economy or of lowering the h-f loss due to the fact that the growth of crystal particles can be suppressed. Ferrite particles produced by the conventional dry method were substantially aggregate particles. Thus, not only was an increase in the density of a green compact unexpected in compaction, but also a high sintering temperature above 1,200° C. was necessary. Ferrite powders produced by the conventional wet method were found to be also inappropriate for the manufacture of sintered ferrites on account of their inherent poor compressibility and the fragility of green compacts for the previously mentioned reason.

In contrast, ferrite particles according to this invention have a high density on compaction because of their quite small size more than 0.05 micron and excellence in the dispersibility. In addition, the sintering process can be fully carried out at a low sintering temperature below 1,050° C. and yet the density of the sintered product approaches the density of ferrite itself. For enhancing the density of a green compact, it is desirable that the particle size ranges from 0.05 to 1.00 micron, preferably from 0.07 to 0.30 micron. To enhance the sintering property, the range must be from 0.05 to 1.00 micron, preferably on the lower side of the range.

Table 4 indicates a comparison of apparent densities of Mn-Zn ferrite sintered bodies produced by this invention and the conventional method. The Mn-Zn ferrite sintered bodies according to this invention in the table were prepared by compacting Mn-Zn ferrite particles, 0.14 micron in the average diameter, obtained according to Example 7 under pressure of 2.5 tons/cm.$^2$ and sintered at a temperature between 950° C. and 1300° C. for four hours in a nitrogen atmosphere, while the sintered bodies according to the conventional method were prepared by pulverizing a mixture of $MnCO_3$, ZnO, and $Fe_2O_3$ in a ball mill, sintering the mix in air at 1000° C. for 1 hour, wet-pulverizing the product in a ball mill for 20 hours, and the ferrite powder then sintered in the same manner as mentioned previously.

TABLE 4

| | Apparent density | |
|---|---|---|
| Sintering temperature for green compact, ° C. | According to this invention | According to conventional method |
| 950 | 4.90 | |
| 1,050 | 4.98 | |
| 1,100 | 5.06 | 4.73 |
| 1,200 | 5.06 | 4.81 |
| 1,300 | 5.12 | 4.96 |

Ferromagnetic materials presently used for audio or video tape or for memory devices in electronic computers are γ-ferric oxide of needle-like particle form. As a matter of fact, this γ-ferric oxide is composed of aggregate particles each consisting of sintered unit particles of needle-like shape as the result of a heating process at more than 300° C. in course of the manufacture. Thus, when dispersed in an organic dispersing media to form a tape material not more than about 0.7–1.0 gram of γ-$Fe_2O_3$ could be packed in 1 cc. of a film material to be applied on tape. In contrast, approximately 1.5–2.1 gram of ferrite particles according to this invention can be packed in 1 cc. of a tape material, because they are inherently separated unit particles that can be easily dispersed in organic dispersing media and are not aggregate particles. The coercive force of ferrite particles, in particular containing cobalt, according to this invention is well comparable with that of γ-$Fe_2O_3$. Although the optimum size of ferrite particles for magnetic memory material is governed by the kind of ferrite, the size of particles having the single domain structure to be desirable for the purpose of enhancing the coercive force is 1 micron or less. The size should be from 0.05 to 1.00 micron in order that particles may be dispersed in a medium without forming aggregate particles under a high density. Ferrite particles produced by the conventional dry method have not been used as magnetic memory material for the reasons that preparation of particles in sizes less than 1 micron was difficult and because ultra-fine particles of about 0.01 micron in size present the problem of superparamagnetic behavior and also intermingle in unit particles of pulverized aggregate particles which deteriorate the memory characteristics considerably.

Table 5 indicates the physical properties of Co-ferrite particles according to this invention and γ-$Fe_2O_3$ powders available on market. It should be noted here that the magnetic properties of γ-$Fe_2O_3$ powders are governed by the external shape of particles, the larger the shape anisotropy, the larger being the coercive force and the less the amount of powder that can be packed in a unit volume, with the restult that the resulting coercive force per unit volume does not increase. Incidentally, the magnetic properties indicated in Table 5 were measured by packing each of the powders in a volume of 1 cm. by 1 cm. by 5 cm. as compact as possible and placing such samples under a magnetic field intensity of 3,600 oersteds.

TABLE 5

| | γ-$Fe_2O_3$ | γ-$Fe_2O_3$ | γ-$Fe_2O_3$ | Co-ferrite according to this invention |
|---|---|---|---|---|
| Particle shape | Cubic | (¹) | (¹) | Cubic |
| Particle diameter (micron) | 0.13 | 1.9 x 0.12 | 0.5 x 0.03 | 0.11 |
| Density on tape | 1.63 | 0.51 | 0.95 | 1.62 |
| Oil absorption | 0.15 | 0.84 | 0.75 | 0.15 |
| Coercive force (oersteds) | 115 | 255 | 320 | 300 |
| Residual magnetism Br (gausses) | 460 | 150 | 168 | 780 |

¹ Needle form.

Ferrite powders according to this invention are in various color tones such as black, yellowish brown, dark brown, etc. For instance, Zn ferrite ($ZnFe_2O_4$) of this invention is brown, shifting to blackish brown with an increase in the amount of $Fe_3O_4$ which establish solid solution therewith. Notably, the solid solution expressed as γ-$Fe_2O_3$·$ZnFe_3O_4$ produced by firing at a temperature below 500° C. a mixture of the abovementioned solid solution and Zn ferrite gives an agreeable brown color which could not be attained by other inorganic pigments. Ferrite powders of this invention can thus find application as stable inorganic pigments or paints. In particular, the zinc ferrite may be used as toilet goods which are harmless to the skin. Furthermore, ferrite powders of this invention may be also applicable to the pigments or paints for absorbing ultra-violet rays since they absorb such rays in large quantities. Whereas ferrites produced by the dry method are poor in the dispersibility and the color tone has a tendency of deteriorating on account of intermingling fine fragments in pulverization, ferrite powders according to this invention can claim to be much superior as pigment material on account of the excellent particle morphology, dispersibility, and the tinting strength.

It has been confirmed by our experiment that the color tones of ferrite powders are affected by the particle size, the optimum color tones as pigments are available from the size of less than 1 micron, and that ferrite powders according to this invention of the range 0.05–1.00 micron in size can be most easily and densely dispersed in dispersing media. It has been also confirmed by us that the dispersibility can be much more improved by introducing a surfactant in a ferrite precipitate in sludge form before the drying step in course of the manufacturing process as mentioned previously.

While the principles and features of this invention have been described above in connection with specific examples and embodiments, it is to be clearly understood that this description is made only by way of example and not as a limitation on the scope of the invention and accordingly, the scope should comprehend all kinds of ferrite particles and processes for manufacture of such ferrite particles as set forth in the claims that follow.

What is claimed is:

1. A dispersible, substantially non-aggregatable, solid solution, spinel-type, single-crystal ferrite particles of substantially isotropic shape containing iron and at least one kind of divalent metal selected from the group consisting of manganese, zinc, cobalt and magnesium, the ratio of the total number of iron atoms to that of the divalent metal atoms being more than 2 and ranging up to 20, said particles having an average size ranging from about 0.05 to 1.0 micron.

2. The spinel-type single-crystal ferrite according to claim 1, in which the particles have an average size ranging from about 0.07 to 0.3 micron.

3. The spinel-type single-crystal ferrite particles according to claim 1, in which the metals are manganese and cobalt and in which the ratio of the total number of iron atoms to that of manganese and cobalt atoms is over 2 and up to 8.

4. The spinel-type single-crystal ferrite particles according to claim 1, in which the divalent metal is zinc and in which the ratio of the total number of iron atoms to that of zinc atoms is over 2 and up to about 6.45.

5. The spinel-type single-crystal ferrite particles according to claim 1, in which the divalent metal is cobalt.

6. The spinel-type single-crystal ferrite particles according to claim 1, in which said divalent metal is manganese.

7. The spinel-type single-crystal ferrite particles according to claim 1, in which said divalent metals are cobalt and zinc and in which the ratio of the total number of iron atoms to that of cobalt and zinc atoms is more than 2 and up to about 6.7.

8. The spinel-type single-crystal ferrite particles according to claim 1, in which said divalent metal is magnesium and in which the ratio of the total number of iron atoms to that of magnesium atoms is more than 2 and up to about 12.5.

9. A dispersible, substantially, non-aggregatable solid solution, spinel-type, single-crystal ferrite particles of substantially isotropic shape containing iron, manganese and zinc, the ratio of the total number of iron atoms to that of the manganese and zinc atoms being more than 2 and ranging up to 20, said particles having an average size of about 0.05 to 1.0 micron.

10. The spinel-type single-crystal ferrite particles according to claim 9, in which the ratio of the total number of the iron atoms to manganese and zinc atoms is over 2 and up to about 2.6 and in which the particles have an average size ranging from about 0.07 to 0.3 micron.

11. The spinel-type single-crystal ferrite particles according to claim 9, in which impurities contained therein consist of less than 0.1 wt. percent each of silicon dioxide, alkali metals, and alkali earth metals and in which the particles have an average size ranging from about 0.07 to 0.3 micron.

12. A process for the production of spinel-type ferrite particles being substantially isotropic in shape and containing iron and at least one kind of divalent metal other than iron in the ratio of at least two atoms of iron to one atom of said at least one divalent metal, wherein an aqueous solution containing ferrous ions and ions of said at least one divalent metal in the ratio of at least two atoms of the ferrous ions to one atom of said at least one divalent metal ions is admixed with an alkali in an amount of 0.55 to 3 mol equivalents of acid in the aqueous solution to obtain a suspension of hydroxides of iron and said at least one divalent metal to provide a pH value of more than 6.5, the suspension thus obtained being maintained at a temperature range of about 60° C. to 90° C. while an oxidizing gas is bubbled into the suspension to stir up and at the same time oxidize the hydroxides until the hydroxides disappear and spinel-type ferrite particles are obtained, and then separating the spinel-type ferrite particles from the solution.

13. The process according to claim 12, wherein the amount of addition of the alkali is more than one mol equivalent of acid present, and wherein the oxidizing gas is bubbled into said suspension with the solution at a temperature of about 65° C. to 80° C., whereby the resulting precipitate of the spinel-type ferrite has the same atomic ratio of iron to the at least one divalent metal as was present in the initial solution.

14. The process according to claim 12, wherein the at least one divalent metal is selected from the group consisting of manganese, zinc, cobalt and magnesium.

15. The process according to claim 14, wherein the divalent metals are at least one of manganese, zinc and cobalt.

16. The process according to claim 15, wherein the divalent metals are manganese and zinc, and the atom ratio of ferrous ions to manganese and zinc ions contained in the initial solution is between about 2 and 2.6.

17. The process according to claim 12, including the steps of adding the separated precipitates of the spinel-type ferrite to another suspension which has been obtained in the same way as the initial suspension was obtained, the solution thus obtained being maintained at a temperature of 60° C. to 90° C. while an oxidizing gas is bubbled into the solution, and then the resulting precipitates of spinel-type ferrite are separated, said steps being repeated at least once.

18. A process for the production of spinel-type manganese, zinc or cobalt ferrite particles being substantially isotropic in shape and containing iron and at least one of manganese, zinc and cobalt in the atomic ratio of substantially two atoms of iron to at least one of manganese, zinc and cobalt, wherein an aqueous solution containing ferrous ions and ions of at least one of manganese, zinc and cobalt in the atomic ratio of substantially two ferrous atoms to manganese, zinc or cobalt atoms is admixed with an alkali in an amount equivalent to acid present in the aqueous solution to obtain a suspension of hydroxides of iron and at least one of manganese, zinc and cobalt to provide a pH value of more than 6.5, the suspension thus obtained being maintained at a predetermined temperature while an oxidizing gas is bubbled into the suspension to stir up and, at the same time, to oxidize the hydroxides until the hydroxides disappear, the combination of said acid equivalent of alkali with said predetermined temperature lying within the range above the dashed curve in FIG. 2A, 2B or 2C following which the precipitates of the spinel-type manganese, zinc or cobalt ferrite are separated from the solution.

References Cited

UNITED STATES PATENTS

| 2,463,413 | 3/1949 | Neel | 252—62.51 |
| 3,084,123 | 4/1963 | Hund | 252—62.56 |
| 3,115,469 | 12/1963 | Hamilton | 252—62.62 |
| 3,129,184 | 4/1964 | Kenney et al. | 252—62.56 |
| 3,317,574 | 2/1967 | Morita et al. | 252—62.56 |
| 3,425,666 | 2/1969 | Linquist et al. | 252—62.62 |
| 3,484,376 | 12/1969 | Paris et al. | 252—62.56 |
| 3,509,057 | 4/1970 | Greger | 252—62.56 |
| 3,549,315 | 12/1970 | Lester et al. | 423—594 |

FOREIGN PATENTS

| 644,639 | 10/1950 | Great Britain | 252—62.56 |
| 664,086 | 1/1952 | Great Britain | 252—62.56 |
| 899,680 | 6/1962 | Great Britain | 252—62.56 |
| 914,773 | 1/1963 | Great Britain | 252—62.62 |
| 510,462 | 4/1952 | Belgium | 252—62.56 |
| 15,164 | 8/1966 | Japan | 252—62.62 |

JACK COOPER, Primary Examiner

U.S. Cl. X.R.

252—62.56, 62.62; 423—594

UNITED STATES PATENT OFFICE
CERTIFICATE OF CORRECTION

Patent No. 3,822,210　　　　　　　　　Dated　July 2, 1974

Inventor(s)　Keizo Iwase, Toshio Takada and Masao Kiyama

It is certified that error appears in the above-identified patent and that said Letters Patent are hereby corrected as shown below:

Page 1 of the patent should indicate the following assignee:

--Nippon Electric Company, Limited,
　Tokyo, Japan--

Signed and Sealed this fourth Day of May 1976

[SEAL]

Attest:

RUTH C. MASON
*Attesting Officer*

C. MARSHALL DANN
*Commissioner of Patents and Trademarks*